United States Patent
Tseng

Patent Number: 6,081,594
Date of Patent: Jun. 27, 2000

[54] HANDS-FREE DEVICE WITH A REPLACEABLE ADAPTER FOR A MOBILE PHONE

[76] Inventor: Sin-Dun Tseng, No. 5, Pao-Kao Rd., Hsientien City, Taipei Hsien, Taiwan

[21] Appl. No.: 09/123,839

[22] Filed: Jul. 27, 1998

[51] Int. Cl.$^7$ .................................................. H04M 1/00
[52] U.S. Cl. ........................................... 379/420; 379/438
[58] Field of Search .................... 379/420, 447, 379/438, 446, 455, 454; 445/90, 127, 434

[56] References Cited

U.S. PATENT DOCUMENTS 4,903,325   2/1990   Yoshitake et al. ................... 455/90

Primary Examiner—Jack Chiang
Attorney, Agent, or Firm—Jackson Walker L.L.P.

[57] ABSTRACT

The present invention provides a hands-free device with a replaceable adapter for a mobile phone. The hands-free device comprises a hands-free body and an adapter. The hands-free body includes a main circuit to provide a hands-free capability to a mobile phone connected with the hands-free device. The adapter is formed by sequentially combining a first plug member, a microphone member and a second plug member. The first plug member has a plurality of signal leads at one terminal to electrically and detachably connect to the hands-free body. The microphone member has a built-in microphone coupled to the main circuit for voice input. The second plug member has a plug head adapted for electrically plugging into an interface socket of a mobile phone to couple interface signals from the mobile phone to the main circuit thereby enabling hands-free use of the mobile phone.

5 Claims, 4 Drawing Sheets

HANDS-FREE DEVICE WITH A REPLACEABLE ADAPTER FOR A MOBILE PHONE

BACKGROUND OF THE INVENTION

1. Field of the Invention

The present invention relates to a hands-free device for a mobile phone, more particularly, to a hands-free device with replaceable adapters for connection with the interface of a mobile phone whereby mobile phones whose interfaces are different can operate with the hands-free device by simply selecting proper adapters.

2. Description of Related Art

Compared with the traditional telephone or the pager, the mobile phone is doubtless one of the favorite communication tools because of its portability and convenience. Generally, a person at any place is able to talk to others via a mobile phone. It is very common for a person to use a mobile phone when driving a car. However, the use of a mobile phone when driving is considered to be unsafe. Therefore, various kinds of hands-free devices have been developed for mobile phones to avoid this problem. FIG. 4 shows a conventional hands-free device 90 which has a connector 91 thereon and a voice jack 92 therein. To enable hands-free use of a mobile, the hands-free device 90 is plugged into an interface socket at the bottom of a mobile phone with the connector 91, and an external speaker and microphone device (not shown) is plugged into the jack 92.

Since the interface sockets of mobile phones manufactured by different telephone venders are not the same, the hands-free device manufacturers have to produce different hands-free devices for use with different mobile phones, which may increase the cost of the hands-free device. On the other hand, users may have to purchase different hands-free devices to use with different mobile phones, which results in waste and inconvenience in the use of the hands-free devices. Therefore, there is a need for the above hands-free device to be improved.

SUMMARY OF THE INVENTION

An objective of the present invention is to provide a hands-free device with a replaceable adapter for a mobile phone wherein the hands-free device can interface with different mobile phones simply by selecting the proper adapter.

Another objective of the present invention is to provide a hands-free device with a replaceable adapter for a mobile phone wherein the adapter is formed by sequentially combining a first plug member, a microphone member and a second plug member whereby the adapter can be compatibly connected to different mobile phones simply by selecting the proper second plug member for combination.

Yet another object of the present invention is to provide a hands-free device with a replaceable adapter for a mobile phone having a built-in microphone in the adapter for voice input thereby eliminating the need for an external microphone.

One aspect of the present invention is to provide a hands-free device with a replaceable adapter for a mobile phone comprising a hands-free body and an adapter. The hands-free body has a speaker and a main circuit therein to provide the hands-free function, a DC jack to supply power and a signal socket coupled to the main circuit. The adapter is formed by sequentially combining a first plug member, a microphone member and a second plug member, wherein the first plug member has a plurality of signal leads at one terminal to electrically and detachably connect to the signal socket of the hands-free body whereby the plurality of signal leads interface with the main circuit, the microphone member has a microphone coupled to the main circuit via the plurality of signal leads for voice input, and the second plug member has a plug head adapted for electrically plugging into an interface socket of the mobile phone to couple interface signals from the mobile phone to the main circuit thereby enabling hands-free use of the mobile phone.

Other objectives, advantages, and novel features of the invention will become more apparent from the following detailed description when taken in conjunction with the accompanying drawings.

DETAILED DESCRIPTION OF PREFERRED EMBODIMENT

Figure 1:
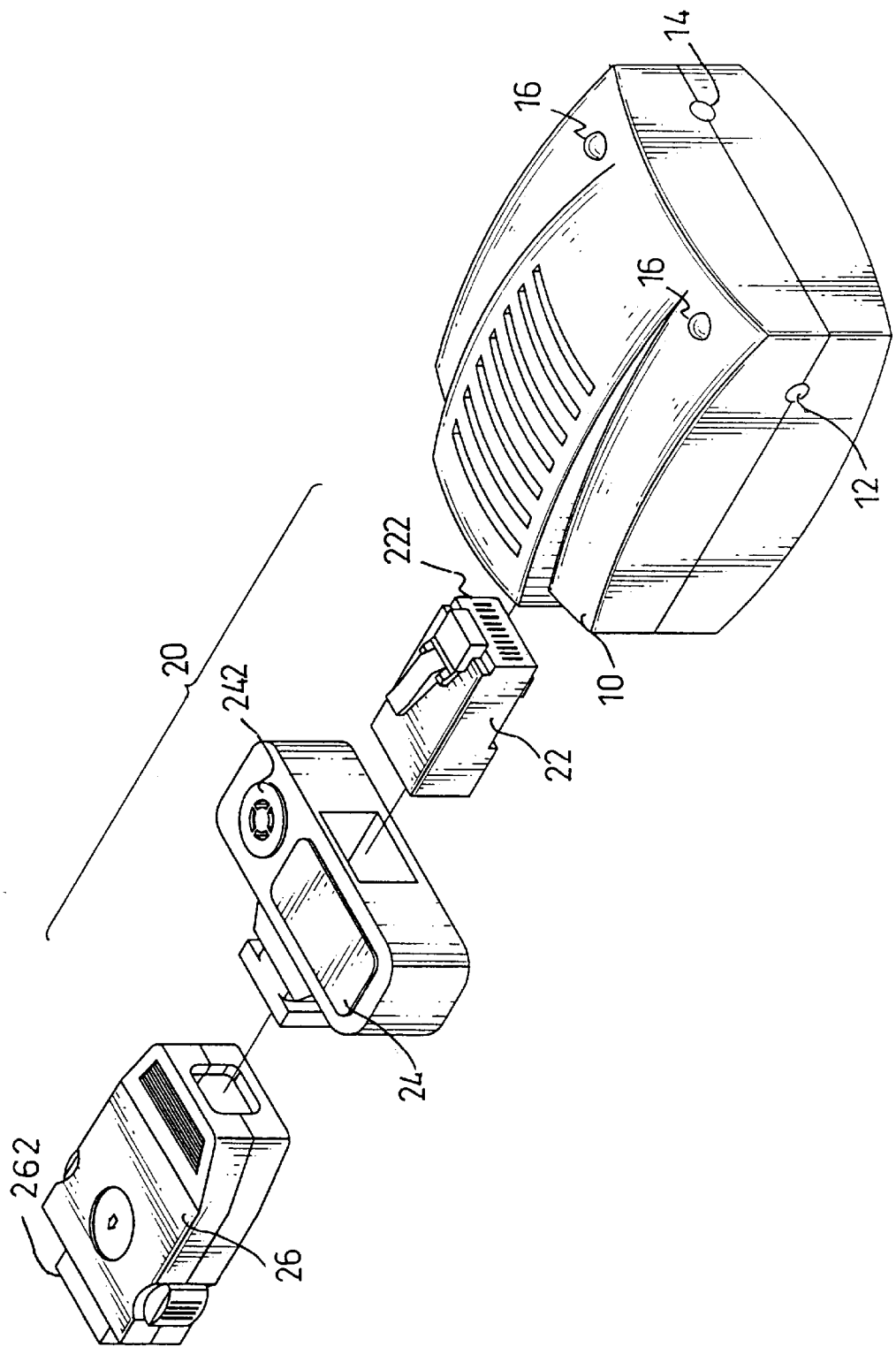
FIG. 1 is an exploded view of a hands-free device in accordance with the present invention.
Figure 2:
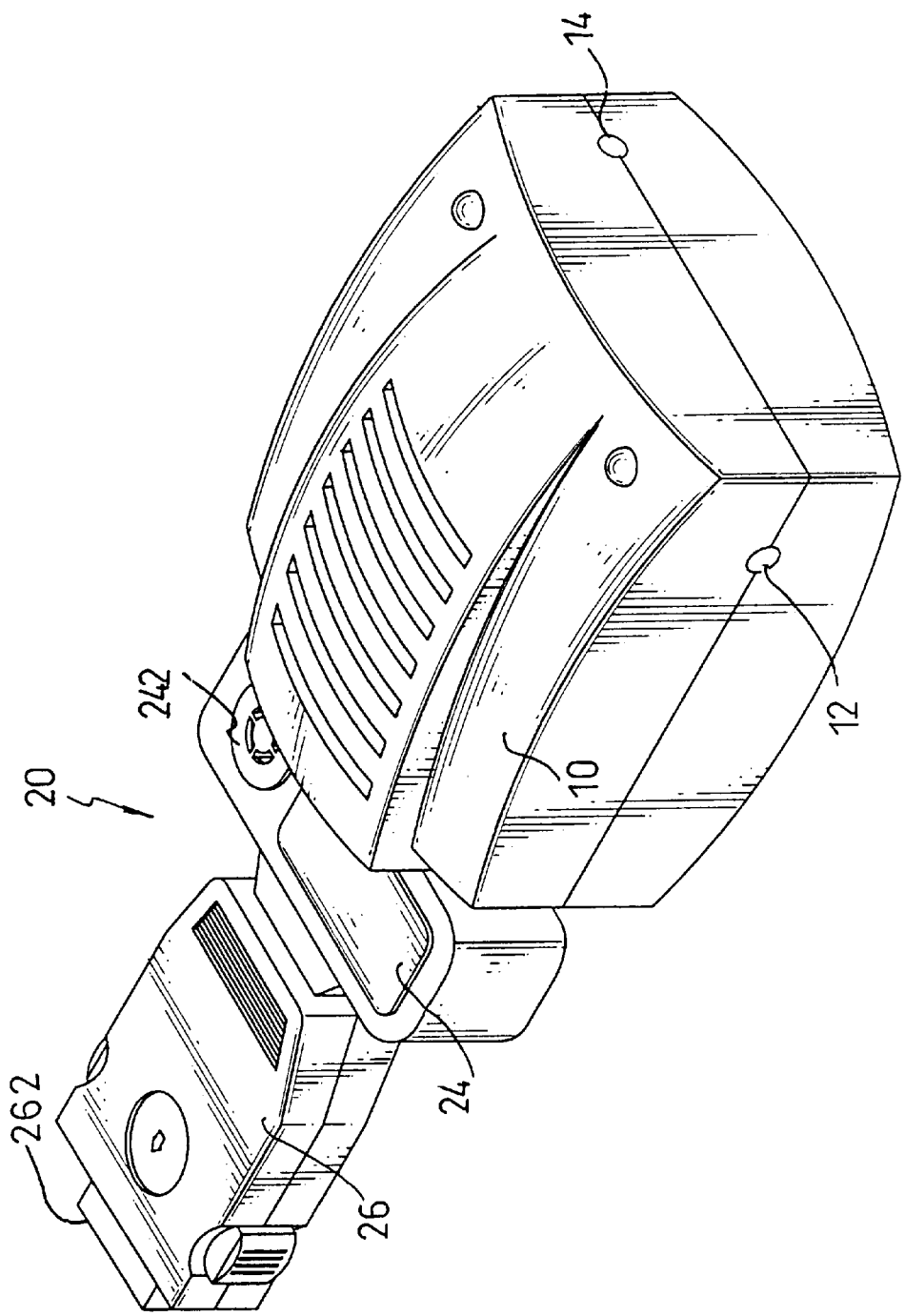
FIG. 2 is a perspective view of the hands-free device in accordance with the present invention.
Figure 3:
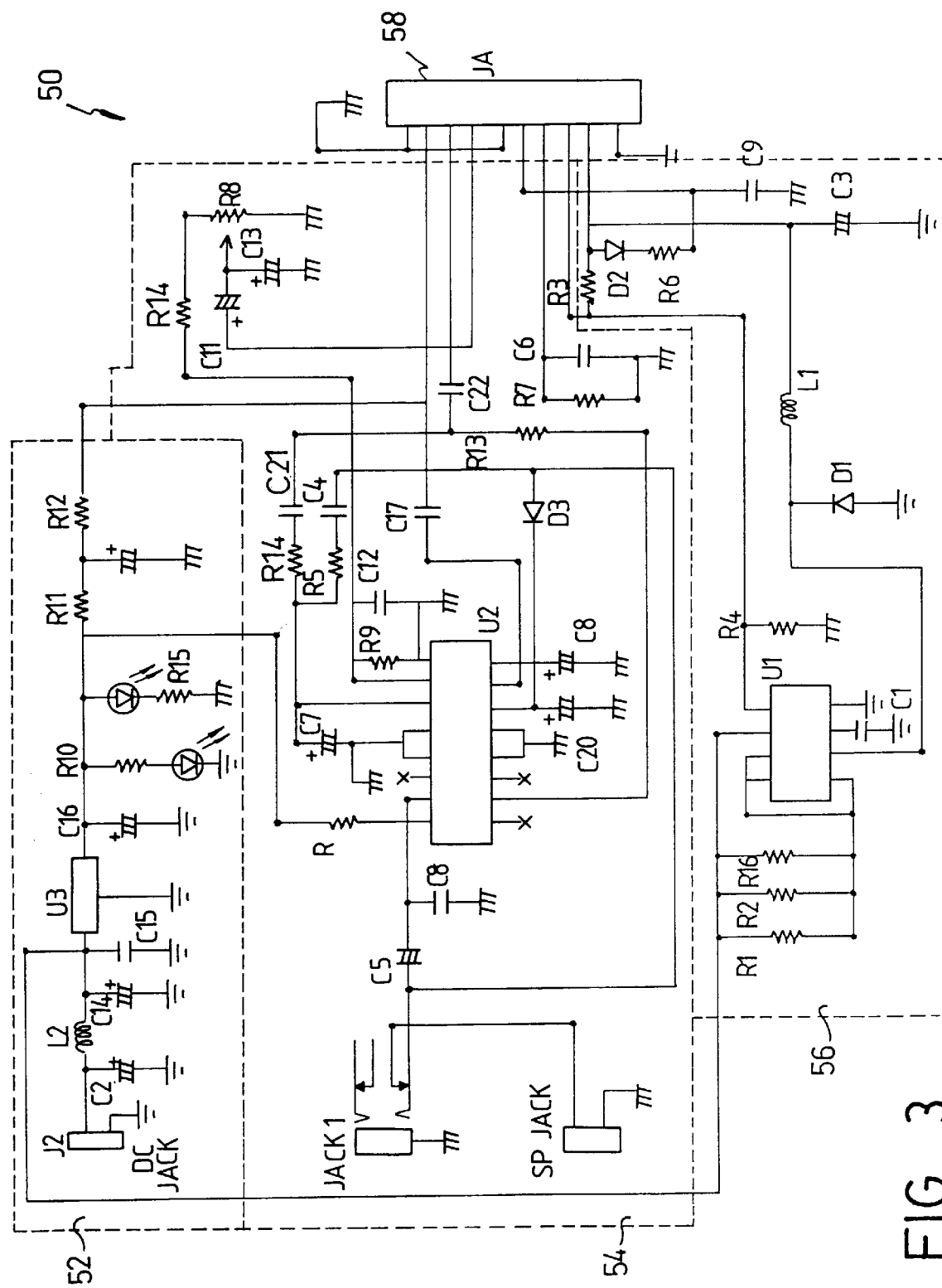
FIG. 3 is a detail circuit diagram of the main circuit in the hands-free device in accordance with the present invention.
Figure 4:
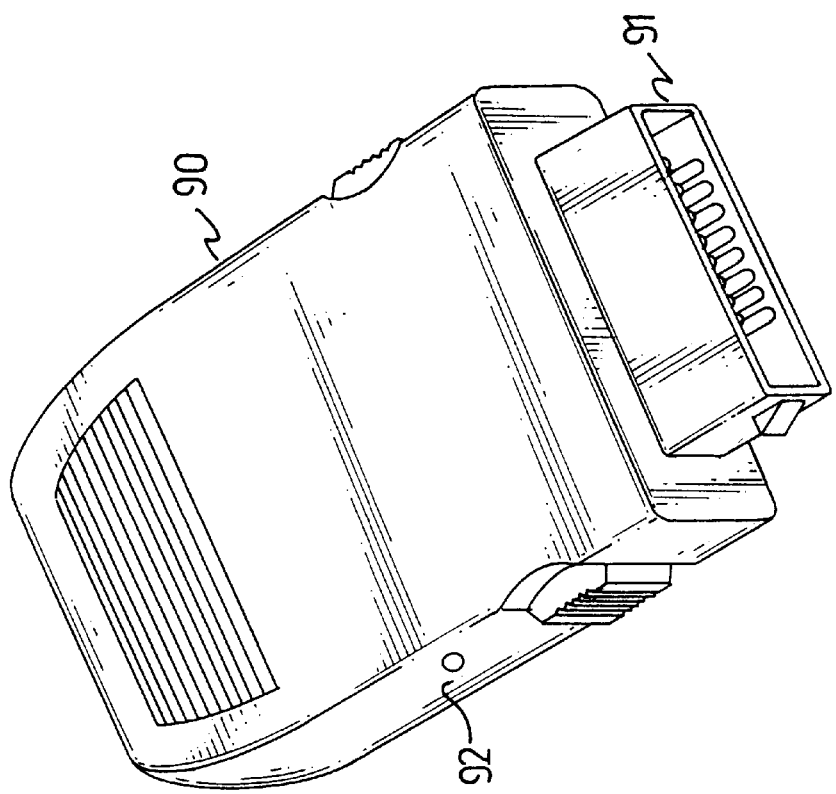
FIG. 4 is a conventional hands-free device for a mobile phone.

Referring to FIG. 1 and FIG. 2, the hands-free device comprises a hands-free body 10 and an adapter 20. A speaker (not shown) and main circuit 50 as shown in FIG. 3 in the hands-free body 10 provide the hands-free capability to a mobile phone connected to the hands-free device. An earphone jack 12 for voice output, a DC jack 14 to supply power from an external power source, and a plurality of indicating lamps 16 to display the status of power are mounted on the external surface of the hands-free body 10. At one terminal of the hands-free body 10, there is a signal socket 58 (as shown in FIG. 3) coupled to the main circuit 50 to provide a mechanism to interface with the adapter 20.

The adapter 20 is formed by sequentially combining a first plug member 22, a microphone member 24 and a second plug member 26. The first plug member 22 has a plurality of signal leads 222 at one terminal to detachably and electrically connect to the signal socket 58 of the hands-free body 10. Preferably, the first plug member 22 is a RJ-45-like telephone connector. The microphone member 24 has a built-in microphone 242 for voice input. The microphone 242 is coupled to the main circuit 50 via the plurality of signal leads 222 of the first plug member 22 whereby input voice is directed to the main circuit 50 for transformation and transmission. The second plug member 26 has a plug head 262 adapted for electrically plugging into the interface socket of a mobile phone whereby interface signals of the mobile phone are coupled to the main circuit 50 through the microphone member 24 and the first plug member 22. Consequently, the mobile phone that connected with the hands-free body 10 via the adapter 20 is provided with a hands-free capability.

The detail circuit diagram of the main circuit 50 is shown in FIG.3, which comprises a power supply circuit 52, a hands-free circuit 54 and a power charge circuit 56. In addition, the signal socket 58 provides interface signals to and from the main circuit 50. The power input to the hands-free device from an external power source is filtered by a π-type low-pass filter and stabilized by a power-stabilization IC in the power supply circuit 52. The power that has been filtered and stabilized is supplied directly to the hands-free circuit 54 and to a connected mobile phone via the signal socket 58. The hands-free circuit 54 is primarily implemented by a hands-free IC and corresponding circuitry, which is coupled to the interface socket of the mobile phone via the signals socket 58 thereby enabling hands-free use of the mobile phone. The power charge circuit 56 makes use of a power charge IC to charge a connected mobile phone via the signal socket 58 thereby providing a power charge capability to the hands-free device.

It is appreciated that the adapter 20 of the hands-free device in accordance with the present invention can be detached from the hands-free body 10 whereby the hands-free device can interface with different mobile phones simply by selecting the proper adapter. Consequentially, there is no need to purchase completely different hands-free devices for use with different mobile phones, thereby eliminating the problems of waste and inconvenience in the use of hands-free devices. Moreover, the adapter 20 of the hands-free device is formed by sequentially combining the first plug member 22, the microphone member 24 and the second plug member 26 whereby manufacturers can produce different hands-free devices for different mobile phones simply by selecting proper second plug members 26 for combination. As a result, the manufacture of the hands-free device is easier and the cost thereof can be decreased. Furthermore, the hands-free device has a built-in microphone 242 in the adapter 20 for voice input thereby eliminating the need for an external microphone device and thus making the use of the hands-free device more convenient.

Although the present invention has been explained in relation to its preferred embodiment, it is to be understood that many other possible modifications and variations can be made without departing from the spirit and scope of the invention as hereinafter claimed.

What is claimed is:

1. A hands-free device with a replaceable adapter for a mobile phone, comprising:

a hands-free body having a speaker and a main circuit therein to provide a hands-free capability, a DC jack to supply power and a signal socket coupled to said main circuit; and an adapter formed by sequentially combining a first plug member, a microphone member and a second plug member, said first plug member having a plurality of signal leads at one terminal to electrically and detachably connect to said signal socket of said hands-free body whereby said plurality of signal leads interface with said main circuit, said microphone member having a microphone coupled to said main circuit via said plurality of signal leads for voice input, and said second plug member having a plug head adapted for electrically plugging into an interface socket of said mobile phone to couple interface signals from said mobile phone to said main circuit thereby enabling hands-free use of said mobile phone.

2. The hands-free device with a replaceable adapter for a mobile phone as claimed in claim 1, wherein said hands-free body further has an earphone jack for voice output.

3. The hands-free device with a replaceable adapter for a mobile phone as claimed in claim 2, wherein said main circuit comprises a power supply circuit to filter and stabilize power from an external power source and supply the same to said main circuit and said mobile phone, a hands-free circuit for coupling to the interface socket of said mobile phone via said adapter to provide a hands-free capability to said mobile phone, and a power charge circuit to charge said mobile phone via said adapter.

4. The hands-free device with a replaceable adapter for a mobile phone as claimed in claim 3, wherein said hands-free body further has a plurality of indicating lamps for displaying the status of power.

5. The hands-free device with a replaceable adapter for a mobile phone as claimed in claim 1, wherein said first plug member is a RJ-45-like telephone connector.

* * * * *